(12) United States Patent
Srivastava

(10) Patent No.: US 11,250,065 B2
(45) Date of Patent: Feb. 15, 2022

(54) PREDICTING AND RECOMMENDING RELEVANT DATASETS IN COMPLEX ENVIRONMENTS

(71) Applicant: The Bank of New York Mellon, New York, NY (US)

(72) Inventor: Kumar S. Srivastava, Mountain View, CA (US)

(73) Assignee: THE BANK OF NEW YORK MELLON, New York, NY (US)

(*) Notice: Subject to any disclaimer, the term of this patent is extended or adjusted under 35 U.S.C. 154(b) by 502 days.

(21) Appl. No.: 15/721,122

(22) Filed: Sep. 29, 2017

(65) Prior Publication Data

US 2018/0096077 A1    Apr. 5, 2018

Related U.S. Application Data

(60) Provisional application No. 62/402,413, filed on Sep. 30, 2016.

(51) Int. Cl.
*G06F 7/00* (2006.01)
*G06F 17/30* (2006.01)
*G06F 16/903* (2019.01)
*G06F 16/248* (2019.01)
*G06F 16/907* (2019.01)
*G06F 16/2457* (2019.01)

(52) U.S. Cl.
CPC ...... *G06F 16/90348* (2019.01); *G06F 16/248* (2019.01); *G06F 16/2457* (2019.01); *G06F 16/907* (2019.01)

(58) Field of Classification Search
CPC ......... G06F 17/30988; G06F 17/30554; G06F 17/30997; G06F 17/30522

USPC .......................................................... 707/723
See application file for complete search history.

(56) References Cited

U.S. PATENT DOCUMENTS

| | | | |
|---|---|---|---|
| 8,180,804 B1* | 5/2012 | Narayanan | G06F 16/24575 707/798 |
| 9,100,430 B1* | 8/2015 | Seiver | H04L 63/02 |
| 2009/0299945 A1* | 12/2009 | Hangartner | G06N 5/02 706/50 |

(Continued)

OTHER PUBLICATIONS

PCT International Search Report and Written Opinion, PCT Application No. PCT/US2017/054497, dated Jan. 10, 2018, 12 pages.

*Primary Examiner* — Binh V Ho
(74) *Attorney, Agent, or Firm* — Fenwick & West LLP

(57) ABSTRACT

A dataset management system organizes datasets using a data relationship graph that serves as a representation of datasets that are related to one another. For example, the data relationship graph includes nodes that each represent a dataset as well as edges that each connect two nodes. Each edge represents a similarity in characteristics of the similar datasets such as a similarity in the datasets' origin, organizational schema, lineage, or data values. When a user is to be provided recommended datasets, the dataset management system identifies candidate datasets by traversing the nodes and edges of the data relationship graph. Amongst these candidate datasets, the dataset management system evaluates users that have accessed the candidate datasets as well as the context in which the candidate datasets were accessed to identify recommended datasets for presentation to the user.

16 Claims, 6 Drawing Sheets

(56) References Cited

U.S. PATENT DOCUMENTS

| | | |
|---|---|---|
| 2010/0268661 A1 | 10/2010 | Levy et al. |
| 2012/0259701 A1 | 10/2012 | Kumazawa et al. |
| 2013/0144818 A1 | 6/2013 | Jebara et al. |
| 2013/0159402 A1* | 6/2013 | Liensberger ........... G06Q 10/00 709/204 |
| 2014/0012870 A1* | 1/2014 | Wark ................... G06Q 10/101 707/769 |
| 2015/0199313 A1* | 7/2015 | Barraclough ......... G06F 40/143 715/716 |
| 2015/0278692 A1* | 10/2015 | Milewski ................ A63F 13/12 706/46 |
| 2015/0363807 A1* | 12/2015 | Katz ................. G06Q 30/0224 705/14.1 |
| 2016/0117752 A1* | 4/2016 | Chacko ............. G06Q 30/0631 705/26.7 |
| 2016/0328406 A1* | 11/2016 | Convertino ......... G06F 3/04842 |
| 2017/0068965 A1* | 3/2017 | Parveen ............. G06Q 30/0633 |
| 2017/0351819 A1* | 12/2017 | Yamamoto .............. G16Z 99/00 |

\* cited by examiner

PREDICTING AND RECOMMENDING RELEVANT DATASETS IN COMPLEX ENVIRONMENTS

CROSS REFERENCE TO RELATED APPLICATIONS

This application claims the benefit of U.S. Provisional Application No. 62/402,413, filed Sep. 30, 2016. The content of the above referenced application is incorporated by reference in its entirety.

TECHNICAL FIELD

This disclosure generally relates to datasets, and more specifically to a dataset management system that organizes datasets and provides recommended datasets for user consumption.

BACKGROUND

Enterprises tend to have multiple large repositories of data that are generated from multiple systems, applications, processes and products. This data is often sent to and collected in multiple repositories that correspond to a set of homogeneous use cases that need to process the data to generate value. These repositories can be databases, file shares, Hadoop clusters, document stores etc. Typically, ad hoc or organic growth in the number of data repositories and a use case specific funneling of the same data into many different data repositories causes the data landscape for an enterprise to be complex and littered with redundant copies of the same data. This may also render the data un-navigable because the data is not well described and also noisy because valuable data is often hidden within or around data that is not relevant to analysis.

As a result, users must manually derive data sets that are interesting to them. Users and enterprises are therefore often unable to fully leverage the value of the data in their repositories. In cases where such value is ultimately discovered, the process to identify and process the relevant data from among the various data sets is often delayed, slowed, fraught with trial and error and overall very expensive in terms of manpower, time and cost for the users and enterprises.

SUMMARY

A dataset management system organizes datasets to understand similarities between various datasets. By doing so, the data management system can provide recommendations to users that include datasets that are likely to be of interest to the user due to the similarities between datasets. Types of similarities between datasets can include similarities in the organizational structure of datasets, the manner in which datasets are updated, the data values in the datasets, and the sources that provided the datasets.

The dataset management system can represent these relationships in a data relationship graph that describes the various types of similarities between datasets. For example, the data relationship graph includes nodes and edges connecting two nodes. Each node represents a dataset while each edge represents a type of similarity between the two datasets represented by the two nodes. Therefore, when recommended datasets are to be provided to a target user, the dataset management system accesses the nodes and edges of the data relationship graph to understand the various relationships between datasets to narrow down the datasets into a set of candidate datasets. Specifically, the dataset management system identifies candidate datasets in the data relationship graph that satisfy criteria, examples of which can be a maximum number of nodes separating a target dataset and a candidate dataset or the presence of an edge representing a particular type of similarity between a target dataset and a candidate dataset.

The dataset management system further narrows the set of candidate datasets to a final set of recommended datasets that are to be provided to a target user. The dataset management system considers how each of the candidate datasets have been previously accessed and consumed. For example, the dataset management system considers the characteristics of users that have previously accessed each candidate dataset, and also considers the context in which each candidate dataset was previously accessed. Specifically, for each candidate dataset, the dataset management system generates a behavioral score that reflects how previous users accessed and consumed the candidate dataset. If the target user is similar to previous users that have accessed the candidate dataset, then the dataset management system assigns a high behavioral score for the candidate dataset. Additionally, for each candidate dataset, the dataset management system generates a context score that reflects the context in which previous users accessed and consumed the candidate dataset. If the contextual cues associated with the target user are similar to the context in which previous users accessed the candidate dataset, then the dataset management system assigns a high context score to the candidate dataset. The dataset management system combines the behavioral score and context score for each candidate dataset and further selects a subset of the candidate datasets as recommended datasets based on the combination of behavioral scores and context scores. The recommended datasets can be provided to the target user and thus, provide an advantageous way for navigating among the datasets.

Embodiments of the dataset management system, as described herein, enable a user to discover, search, understand, interact with and consume disparate datasets. By organizing datasets through a data relationship graph, the dataset management system is able to conduct more comprehensive analysis in comparison to conventional systems that can lead to deeper and richer insights. Namely, the dataset management system can identify recommended datasets with an improved likelihood that the user would be interested in accessing and evaluating the recommended datasets.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
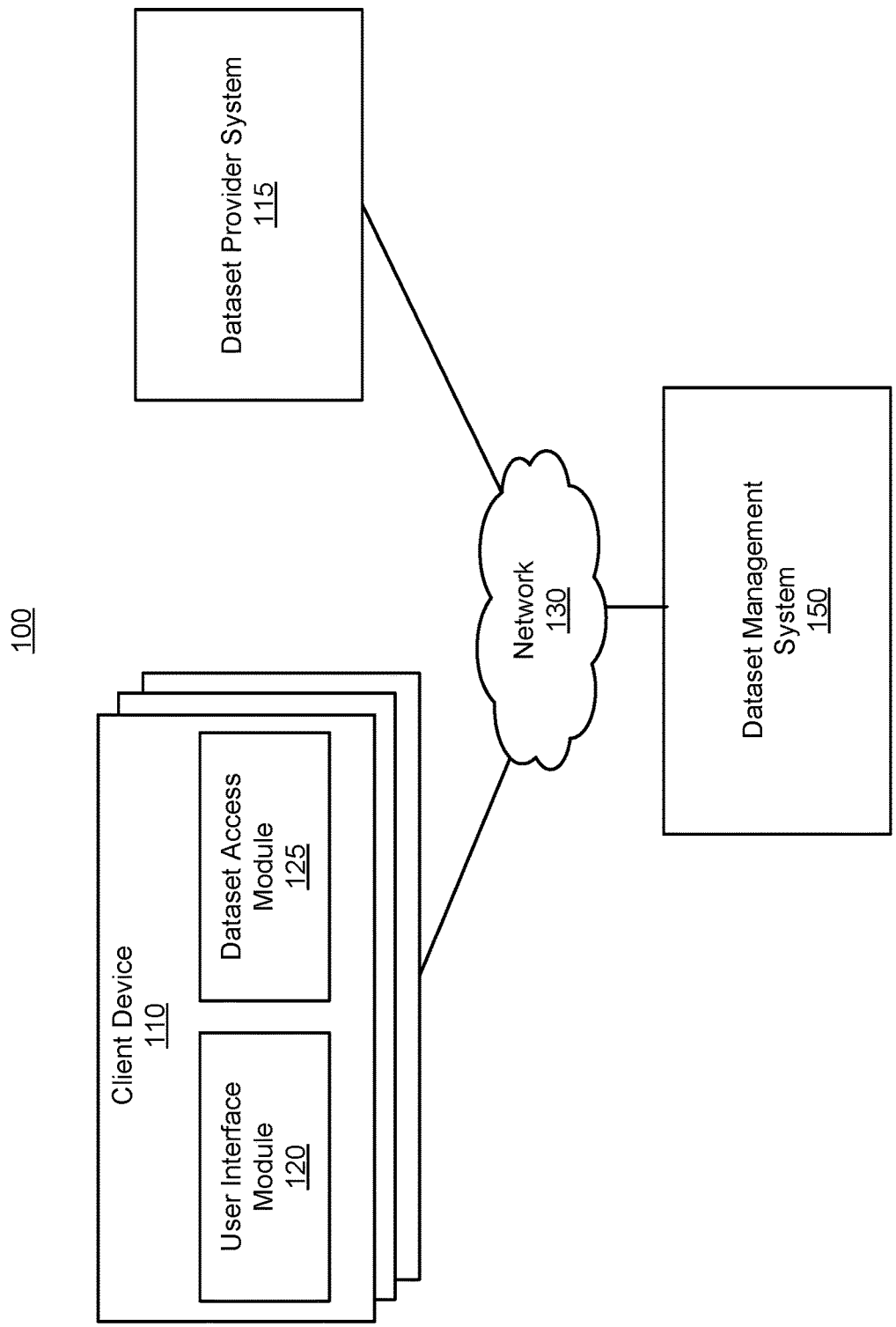
FIG. 1 depicts an overall system environment for providing recommended datasets to a user, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "dataset node 310A," indicates that the text refers specifically to the element having that particular reference numeral. A reference numeral in the text without a following letter, such as "dataset node 310," refers to any or all of the elements in the figures bearing that reference numeral (e.g. "dataset node 310" in the text refers to any one or combination of reference numerals "dataset node 310A," "dataset node 310B," "dataset node 310C," "dataset node 310D," and "dataset node 310E" in the figures).

Overall System Environment

FIG. 1 depicts an overall system environment 100 for providing recommended datasets to a user of a client device 110, in accordance with an embodiment. The system environment 100 can include one or more client devices 110, a dataset provider system 115, and a dataset management system 150. In some embodiments, additional or fewer devices and/or systems are present in the system environment 100. As an example, multiple dataset provider systems 115 may exist in the system environment 100, each of which can provide different datasets to the dataset management system 150. In some embodiments, the dataset provider system 115 and the dataset management system 150 are embodied as a single system.

Network

The network 130 facilitates communications between the client device 110, dataset provider system 115, and dataset management system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Dataset Provider System

The dataset provider system 115 is a system that provides data to the dataset management system 150. The dataset provider system 115 can be embodied as a device such as a client device (e.g., a desktop computer). In some embodiments, the functions performed by the dataset provider system 115 are distributed across a cloud server or rack server.

The dataset provider system 115 can be associated with an enterprise that holds repositories of data. In various embodiments, such data can include private user information such as an individual's personal information (e.g., name, date/place of birth, address, and the like). Such data can also include an individual's banking information, credit card information, and social security number. Other examples of data can include non-user data such as profits, losses, changes in ownership of financial assets, stock prices, and the like.

In some embodiments, the dataset provider system 115 can take additional security measures to ensure that the data provided to the dataset management system 150 is secured. For example, the dataset provider system 115 can encrypt the dataset such that only the dataset management system 150 can appropriately decode the dataset. In various embodiments, the dataset provider system 115 provides datasets to the data management system 150 at constant time intervals. In some embodiments, when new data is available at the dataset provider system 115, the dataset provider system 115 provides datasets to the dataset management system 150.

Client Device

The client device 110 may be an electronic device such as a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc. In other embodiments, the client device 110 is embodied as a cloud server or rack server. In other words, the functions and algorithms performed by the client device 110 can be distributed across multiple processors and/or electronic devices.

The client device 110 may execute instructions (e.g., computer code) stored on a computer-readable storage medium. The client device 110 may include one or more executable applications, such as a web browser, to interact with services and/or content provided by the dataset management system 150. In another scenario, the executable application may be a particular application designed by the dataset management system 150 and locally installed on the client device 110. As one particular scenario, a user of the client device 110 may register with the dataset management system 150 using a user identifier and password. Although the embodiment depicted in FIG. 1 shows three client devices 110, in other embodiments the environment 100 may include other numbers of client devices 110.

Generally, a client device 110 enables a user to provide queries to the dataset management system 150 and further enables a user to access datasets managed by the dataset management system 150. Referring to the modules of the client device 110, the client device 110 includes a user interface module 120 and a dataset access module 125 for enabling these functions.

The user interface module 120 may be an interface that receives user inputs from a user. As one example, the user interface module 120 can communicate with a screen, such as a display screen or a touch screen. As another example, the user interface module 120 can communicate with a different input device such as a mouse or keyboard. Therefore, a user can provide user inputs for specifying a user query that is received by the user interface module 120 and transmitted to the dataset management system 150.

The user interface module 120 further presents data to the user. As an example, the user interface module 120 can present a relationship graph that depicts similarities and relationships between different datasets managed by the dataset management system 150. Therefore, a user can identify and understand how different datasets relate to one another. In some embodiments, the user interface module 120 receives input from the user that specifies the relationships between two or more datasets in the relationship graph. For example, a user can correct a relationship between two datasets in the relationship graph by providing an input through the user interface module 120. In some embodiments, the user interface module 120 provides results that were returned to the client device 110 in response to a query. As a third example, the user interface module 120 can present recommended datasets received from the dataset management system 150. Recommended datasets may be datasets that the dataset management system 150 has deemed to be relevant for the user. Further details in relation to identifying recommended datasets is described below.

The dataset access module 125 provides data to the dataset management system 150 and receives data from the dataset management system 150 on behalf of the client device 110. As one example, the dataset access module 125 transmits queries on behalf of the user of the client device 110 to the dataset management system 150. Each query can specify a criterion or criteria that the data management system 150 uses to identify and return data values. In one scenario, a query can include a specific data value, examples of which can be a name of an individual or a credit card number. In one scenario, a user of the client device 110 may be interested in understanding a stock price over a period of time (e.g., a month or a year). Therefore, the dataset access module 125 transmits a query that identifies the stock as well as the date range that the dataset management system 150 is to analyze to identify the appropriate stock prices. The dataset access module 125 receives responses from the dataset management system 150 in response to the transmitted query. A response to the transmitted query includes data values and/or datasets stored by the dataset management system 150 that satisfy the query.

The dataset access module 125 accesses the datasets that are provided by the dataset management system 150, such as a dataset that includes data values that satisfies a query or a recommended dataset. The dataset access module 125 can provide the accessed dataset to the user interface module 120 for presentation to a user. In various embodiments, the dataset access module 125 sends an indication to the dataset management system 150 that a particular dataset was accessed. Such an indication can include user information of the user that accessed the dataset (e.g., user identifier or user personal information), a time corresponding to when the dataset was accessed, and/or contextual cues corresponding to when the dataset was accessed (e.g., an interface that the user is currently accessing or one or more user actions performed by the user immediately prior to accessing the dataset). Information sent in an indication can enable the dataset management system 150 to understand patterns of how a dataset is consumed, patterns of how a user typically consumes different datasets, and context associated with the accessing of a dataset. Generally, the sent indication enables the dataset management system 150 to identify consumption characteristics and contextual characteristics of a dataset, both of which are described in further detail below.

Dataset Management System

The dataset management system 150 can be one or more electronic devices associated with an enterprise or entity. In some embodiments, the functions performed by the dataset management system 150 can be distributed across a cloud server or rack server. In other words, the functions and algorithms performed by the data management system 150 can be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Generally, the dataset management system 150 organizes datasets using a relationship graph. In one embodiment, the dataset management system 150 receives new datasets from the dataset provider system 115 and updates the relationship graph to reflect relationships between the new datasets and existing datasets of the dataset management system 150. In another embodiment, the dataset management system 150 receives instructions from the dataset provider system 115 to update or alter values of existing datasets that are stored by the dataset management system 150. Therefore, the dataset management system 150 can update the relationship graph to reflect any changes in similarities or relationships that involve the updated dataset.

The dataset management system 150 identifies characteristics of a dataset (e.g., newly received dataset or an existing dataset that is updated) and determines whether the characteristics of the dataset is similar to characteristics of existing datasets. The dataset management system 150 updates the relationship graph to account for similarities or changes to similarities between the dataset and existing datasets. As a first example, the dataset management system 150 generates a representation within the relationship graph of the relationship between the dataset and any existing datasets that share a similarity to the dataset. Each of the dataset and existing datasets can be represented as a node in the relationship graph and any similarities between two datasets is represented as an edge. Thus, for each relationship between two datasets, the dataset management system 150 establishes an edge between the nodes that represent each of the two datasets. As another example, the dataset management system 150 can eliminate representations of relationships within the relationship graph. If a dataset is updated with new data values, the dataset management system 150 can identify that the characteristics of the updated dataset have changed in view of the new data values. Therefore, the dataset management system 150 can eliminate relationships between the updated dataset and other existing datasets that were dependent on the characteristics that have now changed in view of the new data values.

When recommended datasets are to be provided to a client device 110, the dataset management system 150 identifies candidate datasets that each has a sufficient level of similarity to a target dataset by accessing the different representations of relationships stored in the relationship graph. The dataset management system 150 further filters the candidate datasets into a set of recommended datasets that a user would likely be interested in. Candidate datasets are narrowed to the set of recommended datasets based on characteristics associated with each candidate dataset, such as consumption characteristics corresponding to users that accessed the candidate dataset and context characteristics that describe the context during which a user accessed the candidate dataset.

The dataset management system 150 provides the recommended datasets to the client device 110 for user consumption. In one embodiment, the dataset management system 150 provides the recommended datasets in response to a user query. Thus, the recommended datasets may represent datasets that are likely to be of interest to user given the content of the query. In another embodiment, the dataset management system 150 provides the recommended datasets to the client device 110 to be presented to a user in other manners such as in a dashboard or through other communication channels (e.g., text message or email).

Figure 2:
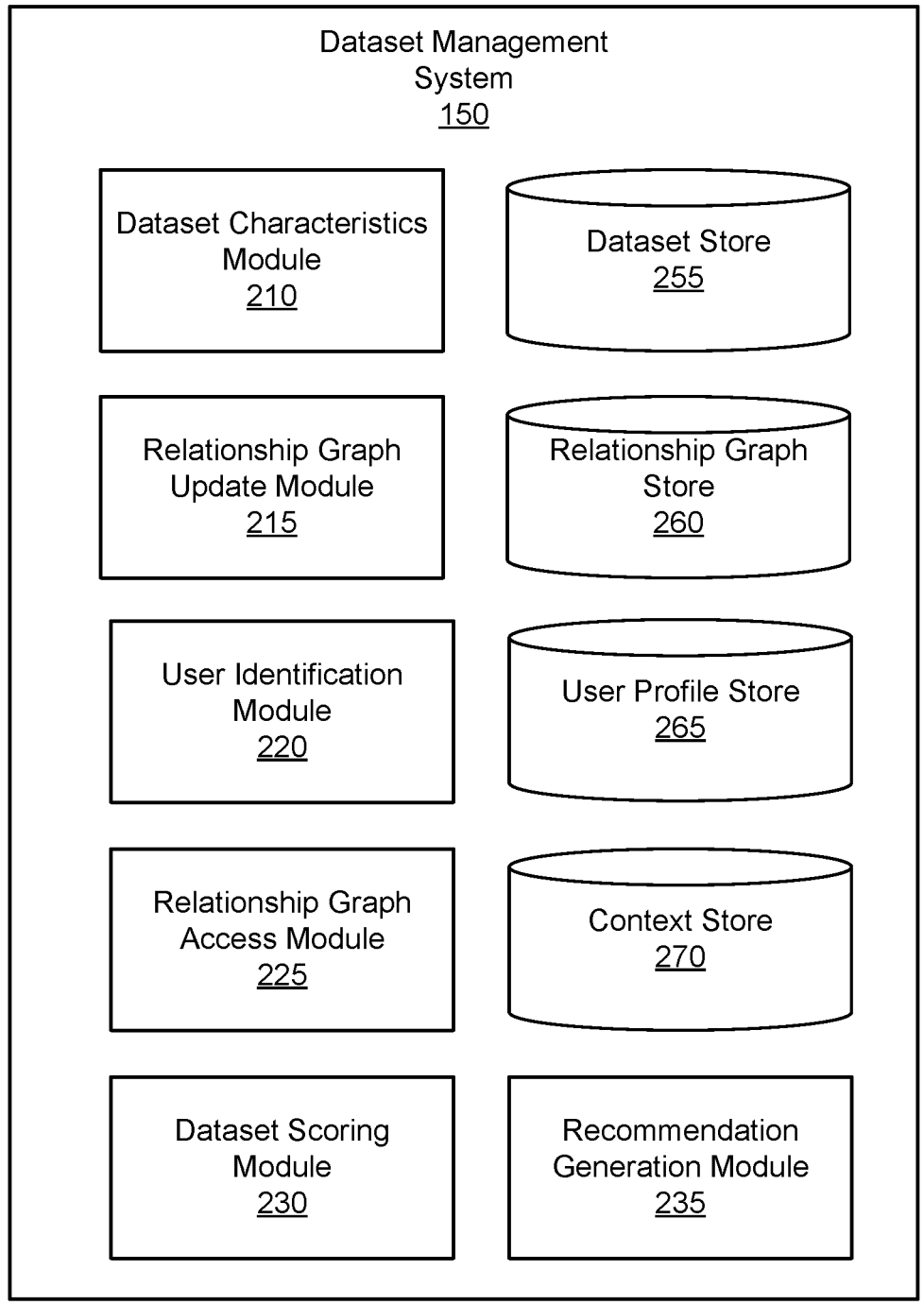
FIG. 2 depicts an example block diagram of the dataset management system, in accordance with an embodiment.

Referring now to FIG. 2, it depicts an example block diagram of a dataset management system 150, in accordance with an embodiment. Here, the dataset management system 150 includes a dataset characteristics module 210, a relationship graph update module 215, a user identification module 220, a relationship graph access module 225, a dataset scoring module 230, a recommendation generation module 235, a dataset store 255, a relationship graph store 260, a user profile store 265, and a context store 270. The operations performed by each module of the dataset management system 150 are described below.

Organizing Datasets with a Relationship Graph

Identifying Characteristics of a Dataset

The dataset characteristics module 210 receives data values of datasets provided by the dataset provider system 115 and stores them in the dataset store 255. Generally, the dataset characteristics module 210 identifies characteristics of each received dataset such that the characteristics of the dataset can be used to identify additional datasets that are similar to the received dataset. Thus, the similarities between datasets can be used to build the relationship graph.

In various embodiments, characteristics of a dataset identified by the dataset characteristics module 210 fall into one of three categories. A first set of characteristics for a dataset refer to characteristics that can be generated when a dataset is newly received, updated, or altered. For example, the first set of characteristics relate to metadata that describe the newly received, updated, or altered dataset. The first set of characteristics of a dataset can include schema characteristics, lineage characteristics, update characteristics, data value characteristics, and provenance characteristics, each of which is described in further detail below. Therefore, the first set of characteristics can be used to identify similarities between two datasets.

The second and third sets of characteristics for a dataset can each be identified by the dataset characteristics module 210 over time. Each of the second and third sets of characteristics describe how the dataset is accessed and consumed by different users over time. Specifically, the second set of characteristics includes consumption characteristics that describe users that access the dataset as well as the behavior of the users that access the dataset. For example, consumption characteristics can include identifying information of a user (e.g., age, demographic group) or consumption patterns of a user (e.g., frequently accessed datasets) such that similar users can be identified by comparing their corresponding consumption characteristics. The third set of characteristics can include context characteristics such as the context in which a user accessed a dataset. In one embodiment, a context characteristic can include actions performed by a user that led the user to access a dataset. For example, if a user accesses a dataset after submitting a search query, the context characteristic can be an indication of a submitted search query. Each of the consumption characteristics and context characteristics are described in further detail below.

Referring to the first set of characteristics for a dataset, the dataset characteristics module 210 identifies schema characteristics that each describe the organization of the data values in the dataset. As an example, data values in a dataset may be organized in columns and rows. A schema characteristic may be an indication of a category of each data value in each column or row, such as a user identifier, an individual's name, a credit card number, a bank account balance, and the like. As an example, a schema characteristic may indicate that a certain row in the dataset has the following organization: <User ID, name, credit card number, account balance>. Additionally or alternatively, a schema characteristic may include attributes of a category of data value that can uniquely identify the category. Such attributes can include a format of the category (e.g., integer, string, Boolean) or unique feature of the data value (e.g., an attribute of a credit card number can be 15 or 16 numerical digits, an attribute of a first name and last name may be an identification of a space between two separate strings). Schema characteristics can further include annotations that describe the semantic meaning of an attribute or the semantic meaning of a category of each data value. Other schema characteristics include acceptable observed ranges for attribute values such as the minimum and maximum observed values for integer type attributes as well as all observed string values for string type attributes.

The dataset characteristics module 210 identifies lineage characteristics of the dataset that each describe the lineage of a dataset. Examples of lineage characteristics for a dataset include a parent dataset (e.g., if the dataset originated from a parent dataset), children dataset (e.g., if children datasets have been derived from the dataset), and sibling datasets (e.g., if other datasets have the same parent dataset). Additionally, as each dataset in the lineage has a certain schema (e.g., schema characteristics), lineage characteristics of a dataset can further include changes to the schema characteristics of a dataset as the dataset is updated with new data values. Changes to schema characteristics include the addition/deletion of a category of data value or an addition of a new column/row in a dataset. In one embodiment, the dataset characteristics module 210 can identify lineage characteristics of a dataset by accessing a lineage map of the dataset. A lineage map may be embodied as a unidirectionally linked map that depicts an initial version of a dataset as well as subsequent versions of the dataset. For example, in this embodiment, the initial version of the dataset can be identified as the parent dataset for the subsequent dataset versions. Alternatively, the subsequent dataset versions can be identified as the children dataset for the initial version of the dataset.

The dataset characteristics module 210 identifies update characteristics of the dataset that each describe how the dataset has been previously updated. Examples of update characteristics include a frequency at which the data set is updated, a rate at which the dataset is changing (e.g., growing or shrinking), a total current size of the dataset, a total number of data values in the dataset, user identifiers and/or system identifiers that have the ability to update the dataset, and the number of applications/processes that are reading or writing to the dataset at any point in time.

The dataset characteristics module 210 identifies data value characteristics that each describe characteristics of the data values of the dataset. Examples of data value characteristics include the value ranges of the data values, statistics of data values (e.g., minimum, maximum, median, mode, dispersion, presence of null values), and cardinality of the data values (e.g., total number of data values in the set). Examples of data value characteristics can also include changes to any of the aforementioned data value characteristics, such as how the value ranges of the data values in the dataset changes as new data values are incorporated into the dataset over time.

The dataset characteristics module 210 identifies provenance characteristics of a dataset, each of which describes a user or entity that the data value or dataset was sourced from. Examples of provenance characteristics may be a system identifier that provided the dataset, a process identifier (e.g., an identifier of an operating system kernel), an internet protocol address, or a user identifier deemed the owner of the dataset. Additional provenance characteristics can include a time that the dataset was originally created or modified, a format of the dataset (e.g., CSV, JSON, XML, unstructured vs structured, image, text, audio, or video).

Referring now to the second set of characteristics, the dataset characteristics module 210 identifies consumption characteristics for a dataset. Consumption characteristics describe users that access the dataset as well as the behavior of the users that access the dataset. For example, consumption characteristics can include information of a user that previously accessed the dataset such as personal information (e.g., user ID, user name, demographic information of the user, age/gender of the user). Information of a user can further include a job title of the user or a team, group, or organization that the user is a part of. As another example, consumption characteristics can include consumption patterns of each user that accessed the dataset. Examples of consumption patterns of a user can include the user's previously accessed datasets and/or data values, the user's previously searched queries, and the user's frequent time of day during which he/she searches and/or accesses datasets. Altogether, the second set of characteristics (e.g., consumption characteristics) can be used to identify users that are similar to one another.

The dataset characteristics module 210 stores the identified consumption characteristics in the user profile store 265. In one embodiment, the user profile store 265 includes individual user profiles that are each assigned to a user, such as a user that has accessed a dataset. As an example, the user profile store 265 may be embodied as a table that is indexed by individual user profiles. Therefore, the identified consumption characteristics of a dataset can be associated with multiple user profiles that are each assigned to a user that has previously accessed the dataset. In another embodiment, the user profile store 265 may be a table that is indexed by individual datasets. Here, the identified consumption characteristics of a dataset can be associated with a single dataset that indexes the table.

Referring now to the third set of characteristics, the dataset characteristics module 210 identifies context characteristics for a dataset, which describe the context in which the dataset was previously accessed. As stated above, a context characteristic can be user actions performed by a user that led the user to access the dataset. For example, the user may have performed N total search queries and accessed the dataset after the Nth query. Therefore, the dataset characteristics module 210 identifies a context characteristic that notes the N total search queries provided by the user. As another example, the dataset may be presented to the user as a recommendation on a dashboard for an extended period of time while the user performed various actions prior to accessing the dataset. Therefore, the dataset characteristics module 210 identifies a context characteristic that indicates the extended period of time and/or the various actions performed by the user prior to accessing the dataset. As another example, context characteristics may include information about how a user accessed the dataset. As a specific example, the user may have accessed the dataset directly from a dashboard or from a shortcut link and therefore, the dataset characteristics module 210 records an indication of the dashboard or the shortcut link that the dataset was accessed from as a context characteristic.

The dataset characteristics module 210 stores the identified context characteristics to a context store 270. In various embodiments, the context store 270 is structured according to individual datasets. For example, the context store 270 can be embodied by a table that is indexed by individual datasets. Therefore, each dataset in the context store 270 can be associated with identified context characteristics for the dataset.

Altogether, the dataset characteristics module 210 identifies the characteristics for a dataset. In various embodiments, the dataset characteristics module 210 identifies the characteristics for a dataset in response to receiving the dataset or in response to an update to the dataset. In other embodiments, the dataset characteristics module 210 accumulates new datasets and/or updates to existing datasets and identifies characteristics for each of these datasets at preset time intervals.

In addition to identifying the characteristics for a dataset, the dataset characteristics module 210 may receive additional characteristics for a dataset. The additional characteristics for a dataset may be provided by a user of a client device 110 or a user of the dataset provider system 115 and can be used to supplement the characteristics of the dataset identified by the dataset characteristics module 210. As an example, the dataset characteristics module 210 can receive user-specified attributes for data values in a dataset. Therefore, the dataset characteristics module 210 can augment the schema characteristics for the dataset with the user-specified attributes.

Determining Similarities Between Datasets for a Relationship Graph

The dataset characteristics module 210 determines similarities between the received dataset and existing datasets by comparing the different characteristics of the received dataset to characteristics of existing datasets. In one embodiment, the dataset characteristics module 210 compares the first set of characteristics of the received dataset (e.g., schema characteristics, lineage characteristics, update characteristics, data value characteristics, and provenance characteristics) to the same first set of characteristics of each existing dataset to determine similarities. In another embodiment, the dataset characteristics module 210 compares all three sets of characteristics of the received dataset to the same three sets of characteristics of each existing dataset to determine similarities. In some embodiments, any combination of the first, second, and/or third characteristics of the received dataset are compared to the same combination of the first, second, and/or third characteristics of the existing datasets to determine similarities between the datasets.

In one embodiment, identified similarities between characteristics of the received dataset and characteristics of an existing dataset are matching characteristics. For example, if the received dataset and an existing dataset each have the same organization of data values in each dataset, an example of which could be that the same categories of data values are in each column of each dataset, then the dataset characteristics module 210 identifies a match between the schema characteristics of the received dataset and the schema characteristics of the existing dataset. In some embodiments, identified similarities between characteristics need not be matches and could be a relative similarity between characteristics. For example, if the received dataset includes data with attribute values that satisfactorily falls within a range of attribute values of an existing dataset, then the dataset characteristics module 210 can identify a similarity between schema characteristics of the received dataset and existing dataset. As an example of this scenario, if a received dataset includes data values with 15 digit credit card numbers (e.g., a corresponding attribute would be 15 numerical digits) and an existing dataset has data values that has an attribute value range of 14-16 numerical digits, then the dataset characteristics module 210 identifies a similarity between the schema characteristics of the received dataset and existing dataset.

In some embodiments, the dataset characteristics module 210 further generates a strength of similarity for each type of characteristic, given the number of identified similarities or the type of identified similarities. As an example, the dataset characteristics module 210 can assign a higher strength of similarity between schema characteristics of a received dataset and schema characteristics of an existing dataset if multiple similarities between schema characteristics are identified as opposed to merely one similarity between schema characteristics. As another example, the dataset characteristics module 210 can assign a higher strength of similarity between schema characteristics of a received dataset that match schema characteristics of an existing dataset in comparison to schema characteristics of a received dataset that satisfy a range specified by the schema characteristics of the existing dataset.

The dataset characteristics module 210 provides the identified characteristics of each dataset, the identified similarities between characteristics of datasets, and/or the determined strength of similarity between characteristics of datasets to the relationship graph update module 215.

The relationship graph update module 215 updates a relationship graph that includes nodes and edges that each connects two nodes. Such a relationship graph can be stored and retrieved from the relationship graph store 260. Generally, each node represents a dataset managed by the dataset management system 150 and each edge represents a similarity between the two nodes interconnected by the edge. Given the characteristics of each dataset and identified similarities between characteristics of datasets from the dataset characteristics module 210, the relationship graph update module 215 updates the relationship graph. If one or more of the datasets is newly provided to the dataset management system 150, then the relationship graph update module 215 generates a new node in the relationship graph that represents each new dataset. Additionally, the relationship graph update module 215 associates the identified characteristics of the dataset to the node. As an example, the identified characteristics of a dataset may be embodied as metadata tags that are stored with the node representing the dataset.

The relationship graph update module 215 generates edges that each represent an identified similarity between the dataset and other datasets that are represented as nodes in the data relationship graph. In various embodiments, there may be a variety of different types of edges, each of which corresponds to a type of characteristic. In further embodiments, each edge may be further assigned a weight depending on the strength of similarity between a characteristic of a dataset represented by a first node and a characteristic of a dataset represented by a second node, where the first node and second node are interconnected through the edge.

Figure 3:
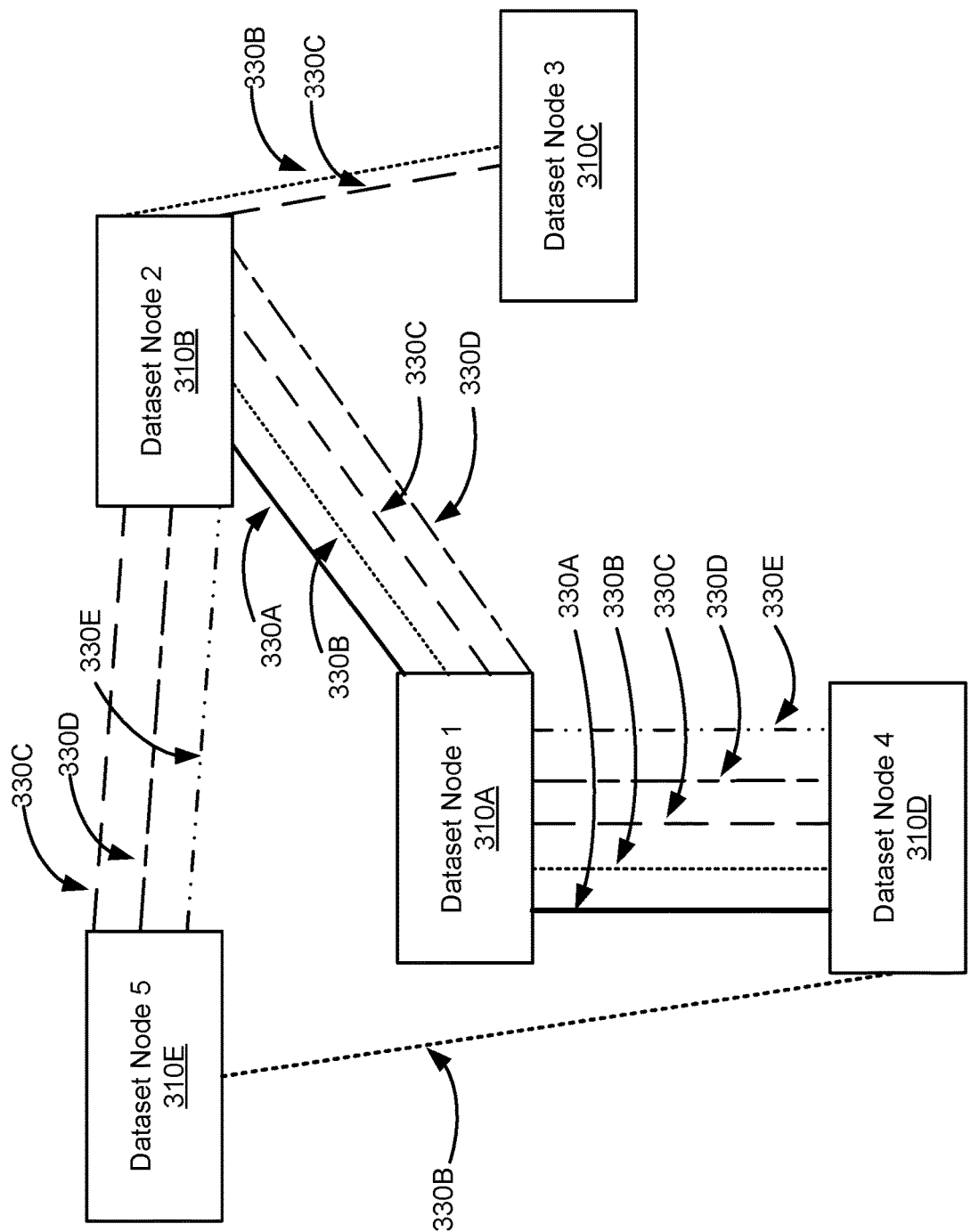
FIG. 3 depicts an example relationship graph including nodes and edges, in accordance with an embodiment.

Reference is now made to FIG. 3, which depicts an example relationship graph 300 that includes nodes (e.g., dataset nodes 310) and edges (e.g., edges 330), in accordance with an embodiment. Specifically, FIG. 3 depicts five different dataset nodes 310A-E and a variety of different types of edges (e.g., edges 330A-E) that interconnect two of the nodes 310.

As an example, edge 330A may specify an identified similarity between schema characteristics of datasets represented by a first node and a second node. Edge 330B may specify an identified similarity between lineage characteristics of datasets represented by a first node and a second node. Edge 330C may specify an identified similarity between update characteristics of datasets represented by a first node and a second node. Edge 330D may specify an identified similarity between data value characteristics of datasets represented by a first node and second node. Edge 330E may specify an identified similarity between provenance characteristics of datasets represented by a first node and second node. Although this example refers to edges 330A-E that represent similarities between characteristics in the first set of characteristics (e.g., schema characteristics, lineage characteristics, update characteristics, data value characteristics, and provenance characteristics), additional edges may be created in the relationship graph that similarly represent similarities between consumption characteristics and context characteristics.

Identifying Candidate Datasets for a User by Accessing the Relationship Graph

The user identification module 220 identifies a target user to be provided recommended datasets. In some embodiments, the user identification module 220 identifies a target user based on the target user's recent interactions with the dataset management system 150. As one example, the user identification module 220 identifies a target user in response to a user query provided by a client device 110 associated with the target user. As another example, the user identification module 220 identifies a target user given that the target user is interacting with different interfaces of the data management system 150 (e.g., a dashboard, a search menu, and the like). In some embodiments, the user identification module 220 identifies that a user is to be provided recommended datasets based on prior behavior of the target user. For example, if the target user typically accesses datasets at a particular time of day, the user identification module 220 can identify the target user when the particular time of day nears or arrives.

In conjunction with identifying a target user, the user identification module 220 determines user information associated with the target user. Generally, user information associated with the target user can be similar to the consumption characteristics, as described above in relation to the dataset characteristics module 210. As an example, user information associated with the target user can be personal information of the target user (e.g., user ID, user name, demographic information of the user, age/gender of the user). The user identification module 220 can receive information associated with the target user from the client device 110 which is then stored in the user profile store 265. In turn, in some embodiments, the user identification module 220 can retrieve information associated with the target user from a user profile in the user profile store 265, given that the user has previously interacted with the dataset management system 150. Additionally, user information determined by the user identification module 220 can include the consumption patterns of the target user (e.g., frequently accessed datasets and/or data values, frequently searched queries, frequent time of day during which datasets are searched or accessed).

In addition to information associated with the user, the user identification module 220 receives contextual cues associated with the user from the client device 110. Generally, contextual cues associated with the user can be similar to the context characteristics, as described above in relation to the dataset characteristics module 210. Contextual cues associated with the user can include recent user actions performed by a user (e.g., user actions performed within a threshold amount of time), a location on an interface that the user is currently interacting with, and a location on the interface that the recommendations are to be presented.

Figure 4:
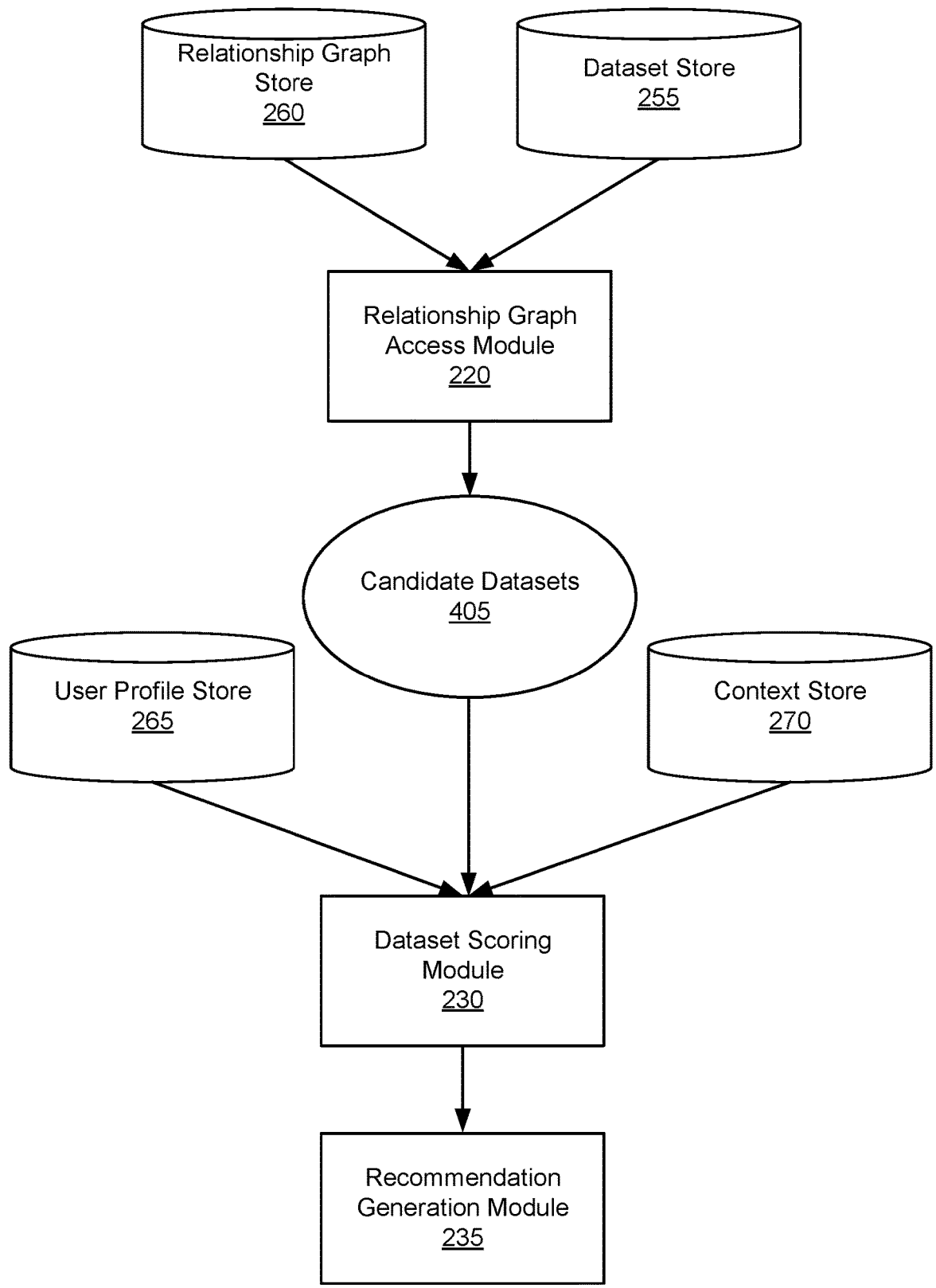
FIG. 4 depicts an example flow process of identifying recommended datasets through the use of the relationship graph, in accordance with an embodiment.

Reference is now made to FIG. 4, which depicts an example flow process 400 of identifying recommended datasets through the use of the relationship graph 300, in accordance with an embodiment. The relationship graph access module 225 accesses the relationship graph 300 stored in the relationship graph store 260 to identify candidate datasets 405 stored in the dataset store 255 that can be included within a recommendation to the user. Generally, the relationship graph access module 225 identifies a target dataset that is represented by a node in the relationship graph and traverses the edges and nodes connected to the node representing the target dataset. A target dataset may be a dataset associated with the target user. As one example, a target dataset may be a dataset most recently accessed by the target user. As another example, a target dataset may be a dataset returned to the target user in response to a search query. The relationship graph access module 225 identifies the edges connected to the node representing the target dataset and identifies nodes connected to the node representing the target dataset through the identified edges. For each identified edge and/or for each identified node, the relationship graph access module 225 compares the edge and/or node to a criterion. If the edge and/or node satisfies the criteria, then an additional dataset represented by the node that satisfies the criteria is identified as a candidate dataset 405.

In various embodiments, a criterion specifies conditions in relation to edges and/or nodes of the relationship graph. As an example, each condition is a requirement on a path between a node representing a target dataset and a potential candidate dataset. For example, a criterion can specify one or more types of edges. Therefore, a candidate dataset is identified if it is connected to the target dataset in the relationship graph through the one or more types of edges specified by the criterion. As another example, a criterion can specify a threshold number of nodes that separate a node representing a target dataset and a node representing a potential candidate dataset. Examples of a criterion can specify types of edges and a threshold number of nodes that both need to be satisfied in order for a dataset to be identified as a candidate dataset 405.

In some embodiments, the criteria is specific for the target user. For example, the criteria can be provided by a user. As another example, the criteria can be determined by the relationship graph access module 225 for a target user based on the past behavior of the target user. For example, if the target user typically accesses datasets that are closely related to one another in the relationship graph, then a criterion can specify a lower threshold number of nodes that separate a target dataset and a potential candidate dataset. This reflects the user's propensity to access closely related datasets. As another example, if the target user typically accesses datasets that originate from the same source, then the criteria can specify the existence of a type of edge (e.g., an edge representing similarity in provenance characteristics) between a target dataset and a potential candidate dataset.

For sake of example, reference is again made to FIG. 3 which depicts the example relationship graph 300. Here, a target dataset can be represented by dataset node 4 (310D). A criterion can specify that a path between a node representing a target dataset and a node representing a candidate dataset 405 must be within two or fewer nodes and that the node(s) in the path must each have a first type of edge (e.g., edge 330A). Therefore, the relationship graph access module 225 traces along the edges extending from dataset node 4 (310D) and other nodes in the relationship graph 300 to determine whether the any nodes satisfy the criteria.

Here, dataset node 1 (310A) is identified as a candidate dataset 405 because it is one node away from dataset node 4 (310D) and is connected to dataset node 4 (310D) through the first type of edge (e.g., edge 330A). Additionally, dataset Node 2 (310B) is also identified as a candidate dataset 405 because it is two nodes away from dataset node 4 (310D) and also has a first type of edge (e.g., 330A) connecting to dataset node 1 (310A) which is further connected to dataset 4 (310D) through the first type of edge 330A. Dataset node 5 (310E) and dataset node 3 (310C) both fail the criteria and are not identified as candidate datasets.

Scoring Candidate Datasets for Generating Recommendations

Given the candidate datasets 405, the dataset scoring module 230 generates multiple scores for each candidate dataset 405. In one embodiment, for each candidate dataset 405, the dataset scoring module 230 generates a behavioral score and a context score. In some embodiment, the dataset scoring module 230 also generates a relationship graph score for each candidate dataset 405.

A behavioral score for a candidate dataset 405 reflects the similarity between user information of a target information and user information of the additional users that have accessed the candidate dataset 405. At a high level, if additional users that are similar to the target user have accessed the candidate dataset 405, then the candidate dataset 405 is likely of interest to the target user as well. The dataset scoring module 230 assigns a higher behavioral score for a candidate dataset 405 if the target user is highly similar to the additional users that have accessed the candidate dataset 405 in comparison to a lower behavioral score for a candidate dataset 405 where the target user is less similar to the additional users that have accessed the different candidate dataset 405.

Specifically, the dataset scoring module 230 generates a behavioral score for a candidate dataset 405 by comparing the consumption characteristics associated with the candidate dataset 405 stored in the user profile store 265 and user information associated with the target user identified by the user identification module 220. Similarities between a target user and additional users can include similarities in user information (e.g., name, date of birth, demographic group, address, group memberships) as well as similarities in behavior such as similarities in consumption patterns, query submissions, access patterns of different datasets, and time of day during which datasets were accessed.

The dataset scoring module 230 also generates a context score for each candidate dataset 405. The context score for a candidate dataset 405 reflects a similarity between the contextual cues for the target user and the context characteristics of the candidate dataset 405. At a high level, if a candidate dataset associated with particular context characteristics is highly popular with users, then a target user with contextual cues that are similar to the particular context characteristics would also likely be interested in the candidate dataset. Specifically, the dataset scoring module 230 generates the context score for the candidate dataset 405 by comparing the context characteristics of the candidate dataset 405 stored in the context store 270 to the contextual cues of the target user identified by the user identification module 220. In various embodiments, the dataset scoring module 230 assigns a higher context score for a candidate dataset 405 where the context characteristics of the candidate dataset 405 is highly similar to the contextual cues of the target user in comparison to a lower context score for a candidate dataset 405 where the context characteristics of the candidate dataset 405 is less similar to the contextual cues of the target user.

In some embodiments, the dataset scoring module 230 also generates a relationship graph score for each candidate dataset 405. The relationship graph score for a candidate dataset 405 reflects the similarity between the candidate dataset 405 and the target dataset, such as a dataset that the target has previously accessed. At a high level, if the candidate dataset 405 is highly similar to the target dataset, then a target user is likely also be interested in the candidate dataset 405.

In one embodiment, the dataset scoring module 230 generates a relationship graph score for a candidate dataset 405 by comparing the first set of characteristics of the candidate dataset 405 (e.g., schema characteristics, lineage characteristics, update characteristics, data value characteristics, and provenance characteristics) to the first set of characteristics of the target dataset. The dataset scoring module 230 can assign a higher relationship graph score to a candidate dataset 405 that shares a larger number of characteristics from the first set of characteristics with the target dataset in comparison to a different candidate dataset 405 that shares a fewer number of characteristics from the first set of characteristics with the target dataset.

In some embodiments, the dataset scoring module 230 generates a relationship graph score for a candidate dataset 405 depending on the relationship between the candidate dataset 405 and a target dataset in the relationship graph 300. As one example, the dataset scoring module 230 considers the weights assigned to each of the one or more edges between the candidate dataset 405 and the target dataset. In one embodiment, an increase in the weights assigned to edges between the candidate dataset 405 and a target dataset results in a corresponding increase in the relationship graph score for the candidate dataset 405.

In some embodiments, the dataset scoring module 230 generates a relationship graph score for a candidate dataset 405 depending on how the relationship graph access module 225 traced the relationship graph 300 to identify the candidate dataset 405. For example, a candidate dataset 405 that easily satisfied the criteria (e.g., was one node away whereas the criteria specified a maximum of two nodes away) can be assigned a higher relationship graph score in comparison to a different candidate dataset that was closer to failing the criteria (e.g., was two nodes away, thereby satisfying the specified max of two nodes).

For each candidate dataset 405, the dataset scoring module 230 combines the behavioral score and the context score to generate an accumulated score for the candidate dataset 405. In some embodiments, the dataset scoring module 230 further combines the relationship graph score for the candidate dataset in determining the accumulated score. In various embodiments, the dataset scoring module 230 determines the sum, product, average, weighted average or other statistical measure of the combination of the behavioral score, context score, and relationship graph score to obtain the accumulated score for a candidate dataset 405. The accumulated score for a candidate dataset 405 is provided to the recommendation generation module 235 to generate the recommendation.

Recommendation generation module 235 ranks the candidate datasets 405 based on their accumulated scores and generates a recommended dataset that is provided to the client device 110. As one example, the recommendation generation module 235 selects a threshold number of the top ranked candidate datasets to be provided as recommendations. As an example, only the top ranked candidate dataset is selected as a recommended dataset.

The recommendation generation module 235 structures a recommendation that includes the recommended datasets and provides the recommendation to the client device 110. Examples of a structured recommendation may be an interface. For example, if the recommendation is to be provided to a user on a dashboard, then the recommendation generation module 235 can generate an interface including the recommendation on the dashboard. If the recommendation is to be provided to a user in response to a search query, then the recommendation generation module 235 can generate the interface with recommended datasets that are to be displayed in addition to the search results. As another example, if the recommendation is to be provided through a particular communication channel (e.g., email or text message), then the recommendation can be provided as a selectable link such that when selected, the recommended datasets are presented.

Process for Organizing Datasets and Generating Recommendations

Figure 5:
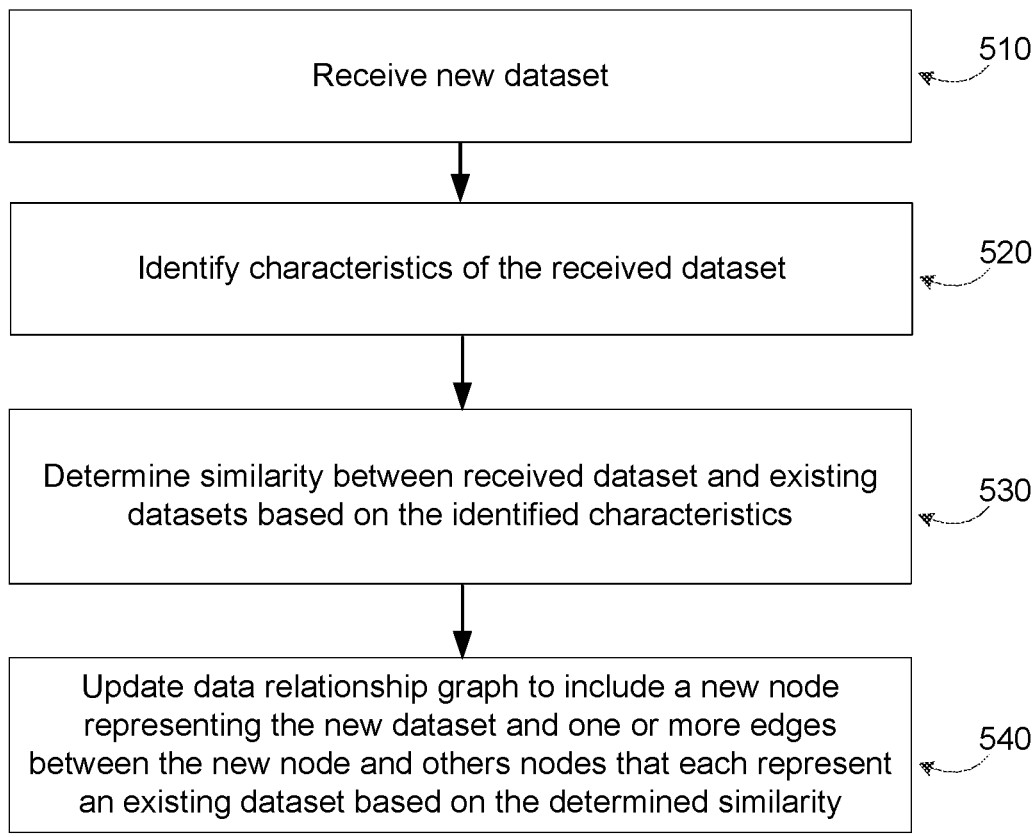
FIG. 5 is an overall flow process for managing the relationship graph, in accordance with an embodiment.

FIG. 5 is an overall flow process 500 for managing the relationship graph 300, in accordance with an embodiment. The dataset management system 150 receives 510 a new dataset from the dataset provider system 115. The dataset management system 150 identifies 520 characteristics of the received dataset. In one embodiment, the dataset management system 150 identifies a first set, second set, and third set of characteristics for the received dataset. The dataset management system 150 determines 530 similarities between the received dataset and other existing datasets using the identified characteristics of the received dataset. As one example, the dataset management system 150 compares identified characteristics of the received dataset with characteristics of each of the existing datasets. In one embodiment, the characteristics of each existing dataset is stored in a data relationship graph that includes nodes that each represent datasets managed by the dataset management system 150. With the determined similarities, the dataset management system 150 updates 540 the data relationship graph to include a new node that represents the received dataset. Additionally, the dataset management system 150 can further update the data relationship graph to include one or more edges connecting the new node representing the received dataset and another node representing an existing dataset. Each edge represents a determined similarity between the received dataset and an existing dataset.

Figure 6:
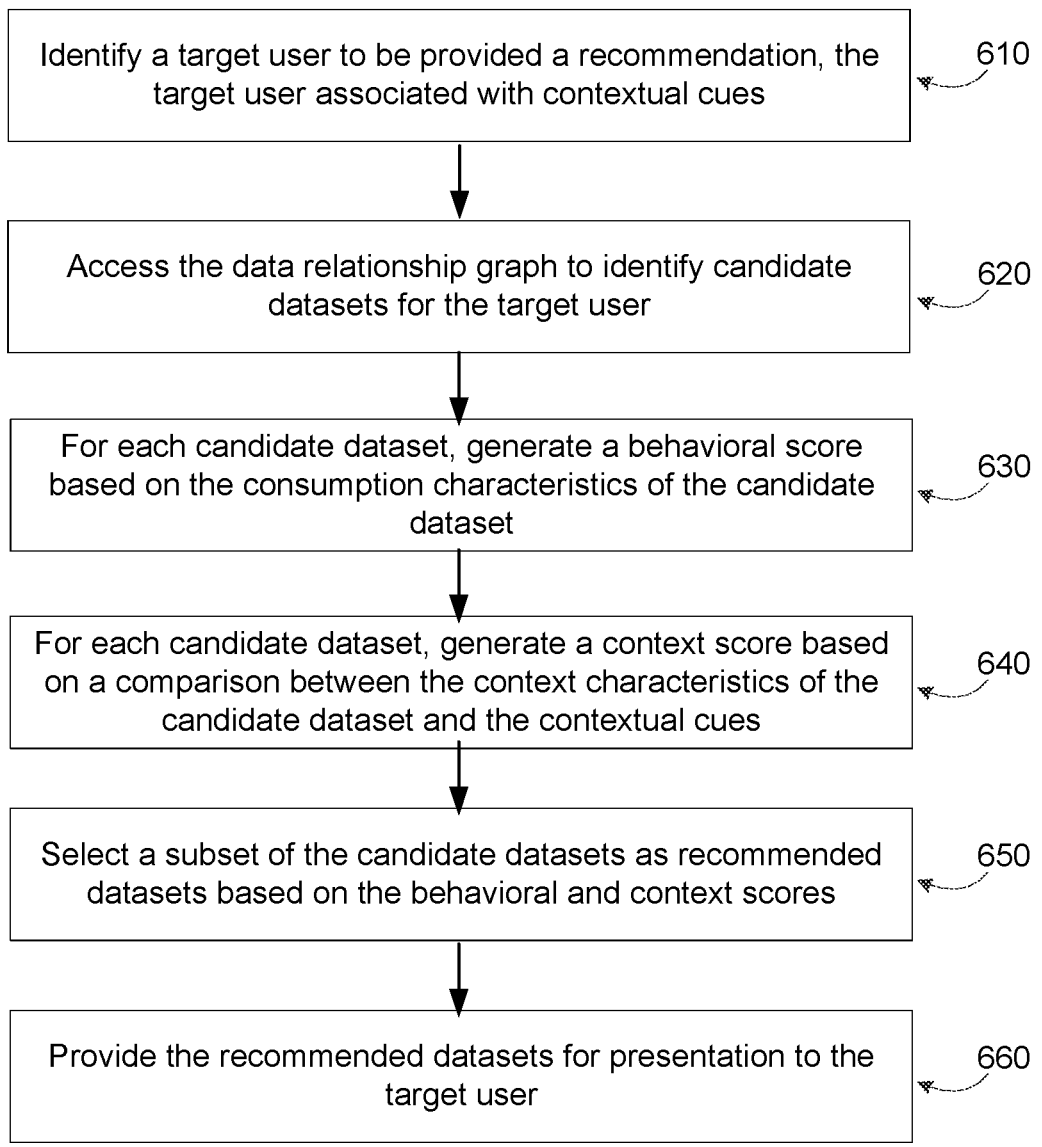
FIG. 6 depicts an overall flow process for providing recommended datasets to a target user, in accordance with an embodiment.

FIG. 6 depicts an overall flow process 600 for providing recommended datasets to a target user, in accordance with an embodiment. The dataset management system 150 identifies 610 a target user to be provided a recommendation. The target user is further associated with contextual cues. The dataset management system 150 accesses 620 the data relationship graph 300 to identify candidate datasets for the target user. As an example, candidate datasets are represented by nodes in the data relationship graph 300 that satisfy a criterion, such as the presence of an edge between the node representing the candidate dataset and a node representing a target dataset. Such edges can be dependent on a first set of characteristics of the candidate dataset and the target dataset. The dataset management system 150 further narrows the set of candidate datasets. Specifically, for each candidate dataset, the dataset management system 150 generates 630 a behavioral score based on a second set of characteristics of the candidate dataset and generates 640 a context score based on a comparison between a third set of characteristics of the candidate dataset and the contextual cues. Given at least the behavioral score and context score for each candidate dataset, the dataset management system 150 selects 650 a subset of the candidate datasets as recommended datasets. The dataset management system 150 provides 660 the recommended datasets for presentation to the target user.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing recommended datasets, the method comprising:
  accessing a dataset store storing datasets, wherein each dataset includes a plurality of data values and is associated with dataset characteristics comprising a schema of the dataset, consumption characteristics including identification of users who have previously accessed the dataset, and context characteristics indicative of contexts in which users have previously accessed the dataset;
  identifying a target user to be provided recommended datasets from the dataset store;
  accessing a data relationship graph comprising a plurality of dataset nodes that each represent a dataset from the dataset store and a plurality of types of edges connecting the dataset nodes, wherein each type of edge represents a measure of a type of similarity between the datasets such that dataset nodes representing datasets with multiple types of similarities are connected by multiple edges and wherein at least one of the types of edges represents a determined similarity between organization of categories and data values stored in the datasets;
  identifying a target dataset that is associated with the target user, the target dataset being represented in the data relationship graph by a target dataset node;
  identifying candidate datasets for the target user by identifying a set of dataset nodes in the data relationship graph that are connected to the target data node with a plurality of specified types of edges;
  for each candidate dataset:
    generating a behavioral score based on consumption characteristics of the candidate dataset; and
    generating a context score based on a similarity between recent actions performed by the target user, and context characteristics of the candidate dataset including actions performed prior to accessing the candidate dataset by other users who have previously accessed the candidate dataset;
  selecting a subset of the candidate datasets as the recommended datasets based on a combination of the behavioral score and context score for each candidate dataset; and
  providing the recommended datasets to a client device for viewing by the target user.

2. The method of claim 1, wherein identifying candidate datasets for the target user further comprises:
  comparing a type of the edge connected to the node to a condition of a criterion, wherein the condition of the criterion specifies one or more edge types along a path between the node in the data relationship graph representing the target dataset and a node representing a candidate dataset,
  wherein the different dataset is selected as the candidate dataset for the target user based on the comparison between the type of the edge connected to the node and the condition of the criterion.

3. The method of claim 1, wherein identifying candidate datasets for the target user further comprises:
comparing a number of nodes between the node representing the target dataset and the different node representing the different dataset to a condition of a criterion, wherein the condition of the criterion specifies a threshold number of nodes along a path between the node in the data relationship graph representing the target dataset and a node representing a candidate dataset,
wherein the different dataset is selected as the candidate dataset for the target user based on the comparison between the type of the edge connected to the node and the condition of the criterion.

4. The method of claim 1, wherein the data relationship graph comprises two nodes representing two datasets, the two nodes connected to each other via a plurality of edges, each edge in the plurality representing a similarity between one of lineage characteristics, update characteristics, data values characteristics, and provenance characteristics of the two datasets.

5. The method of claim 1, wherein the consumption characteristics of the candidate dataset comprise personal information of one or more users that have accessed the candidate dataset and behavior of the one or more users that have accessed the candidate dataset.

6. The method of claim 5, wherein generating the behavioral score for each candidate dataset comprises:
determining a similarity between the consumption characteristics describing the one or more users and characteristics of the target user; and
generating the behavioral score based on the determined similarity.

7. The method of claim 1, wherein generating the context score for each candidate dataset comprises:
identifying contextual cues of the target user to be provided the recommended datasets;
determining a similarity between the context characteristics of the candidate dataset and the contextual cues of the target user; and
generating the context score based on the determined similarity.

8. The method of claim 1, further comprising:
for each candidate dataset, generating a data relationship score representing a level of similarity between the candidate dataset and a target dataset, and
wherein the subset of the candidate datasets is further selected based on the generated data relationship score for each candidate dataset.

9. A non-transitory computer-readable storage medium comprising instructions that, when executed by a processor, causes the processor to:
access a dataset store storing datasets, wherein each dataset includes a plurality of data values and is associated with dataset characteristics comprising a schema of the dataset, consumption characteristics including identification of users who have previously accessed the dataset, and context characteristics indicative of contexts in which users have previously accessed the dataset;
identify a target user to be provided recommended datasets from the dataset store;
access a data relationship graph comprising a plurality of dataset nodes that each represent a dataset from the dataset store and a plurality of types of edges connecting the dataset nodes, wherein each type of edge represents a measure of a type of similarity between the datasets such that dataset nodes representing datasets with multiple types of similarities are connected by multiple edges and wherein at least one of the types of edges represents a determined similarity between organization of categories and data values stored in the datasets;
identify a target data set that is associated with the target user, the target dataset being represented in the data relationship graph by a target dataset node;
identify candidate datasets for the target user by identifying a set of dataset nodes in the data relationship graph that are connected to the target data node with a plurality of specified types of edges;
for each candidate dataset:
generate a behavioral score based on consumption characteristics of the candidate dataset; and
generate a context score based on a similarity between recent actions performed by the target user, and context characteristics of the candidate dataset including actions performed prior to accessing the candidate dataset by other users who have previously accessed the candidate dataset;
select a subset of the candidate datasets as the recommended datasets based on a combination of the behavioral score and context score for each candidate dataset; and
provide the recommended datasets to a client device for viewing by the target user.

10. The non-transitory computer-readable storage medium of claim 9, wherein the instructions that cause the processor to identify candidate datasets for the target user further comprises instructions that, when executed by the processor, cause the processor to:
compare a type of the edge connected to the node to a condition of a criterion, wherein the condition of the criterion specifies one or more edge types along a path between the node in the data relationship graph representing the target dataset and a node representing a candidate dataset,
wherein the different dataset is selected as the candidate dataset for the target user based on the comparison between the type of the edge connected to the node and the condition of the criterion.

11. The non-transitory computer-readable storage medium of claim 9, wherein the instructions that cause the processor to identify candidate datasets for the target user further comprises instructions that, when executed by the processor, cause the processor to:
compare a number of nodes between the node representing the target dataset and the different node representing the different dataset to a condition of a criterion, wherein the condition of the criterion specifies a threshold number of nodes along a path between the node in the data relationship graph representing the target dataset and a node representing a candidate dataset,
wherein the different dataset is selected as the candidate dataset for the target user based on the comparison between the type of the edge connected to the node and the condition of the criterion.

12. The non-transitory computer-readable storage medium of claim 9, wherein the data relationship graph comprises two nodes representing two datasets, the two nodes connected to each other via a plurality of edges, each edge in the plurality representing a similarity between one of lineage characteristics, update characteristics, data values characteristics, and provenance characteristics of the two datasets.

13. The non-transitory computer-readable storage medium of claim 9, wherein the consumption characteristics of the candidate dataset comprise personal information of one or more users that have accessed the candidate dataset and behavior of the one or more users that have accessed the candidate dataset.

14. The non-transitory computer-readable storage medium of claim 13, wherein the instructions that cause the processor to generate the behavioral score for each candidate dataset further comprises instructions that, when executed by the processor, causes the processor to:
  determine a similarity between the consumption characteristics describing the one or more users and characteristics of the target user; and
  generate the behavioral score based on the determined similarity.

15. The non-transitory computer-readable storage medium of claim 9, wherein the instructions that cause the processor to generate the context score for each candidate dataset further comprises instructions that, when executed by the processor, causes the processor to:
  identify contextual cues of the target user to be provided the recommended datasets;
  determine a similarity between the context characteristics of the candidate dataset and the contextual cues of the target user; and
  generate the context score based on the determined similarity.

16. The non-transitory computer-readable storage medium of claim 9, further comprising instructions that, when executed by the processor, causes the processor to:
  for each candidate dataset, generate a data relationship score representing a level of similarity between the candidate dataset and a target dataset, and
  wherein the subset of the candidate datasets is further selected based on the generated data relationship score for each candidate dataset.

\* \* \* \* \*